United States Patent [19]
Iida

[11] Patent Number: 6,049,335
[45] Date of Patent: *Apr. 11, 2000

[54] GRAPHICS EDITING DEVICE WHICH DISPLAYS ONLY CANDIDATE COMMANDS AT A POSITION ADJACENT TO A SELECTED GRAPHIC ELEMENT AND METHOD THEREFOR

[75] Inventor: Masahiro Iida, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,169

[22] Filed: Jun. 27, 1997

Related U.S. Application Data

[63] Continuation of application No. 08/086,350, Jul. 6, 1993, abandoned.

[30] Foreign Application Priority Data

Jul. 6, 1992 [JP] Japan .................................. 4-178674

[51] Int. Cl.⁷ ...................................................... G06F 3/03
[52] U.S. Cl. .............................................................. 345/352
[58] Field of Search .................................... 345/352–358, 345/145–146

[56] References Cited

U.S. PATENT DOCUMENTS

| | | | |
|---|---|---|---|
| 4,679,137 | 7/1987 | Lane et al. ................................. | 700/83 |
| 4,723,211 | 2/1988 | Barker et al. ............................ | 707/514 |
| 4,815,029 | 3/1989 | Barker et al. ............................ | 707/516 |
| 4,823,283 | 4/1989 | Diehm et al. ............................ | 345/352 |
| 4,868,766 | 9/1989 | Oosterholt ............................... | 345/420 |
| 4,896,291 | 1/1990 | Gest et al. ............................... | 345/353 |
| 5,038,401 | 8/1991 | Inotsume ................................. | 345/169 |
| 5,208,910 | 5/1993 | Higgins et al. .......................... | 345/352 |
| 5,287,514 | 2/1994 | Gram ....................................... | 395/156 |
| 5,347,628 | 9/1994 | Brewer et al. ........................... | 345/351 |
| 5,450,539 | 9/1995 | Ruben ..................................... | 395/155 |
| 5,459,831 | 10/1995 | Brewer et al. .......................... | 395/155 |
| 5,496,177 | 3/1996 | Collia et al. ............................. | 345/352 |
| 5,589,856 | 12/1996 | Stein et al. .............................. | 345/146 |

FOREIGN PATENT DOCUMENTS

| | | |
|---|---|---|
| 0464742 | 1/1992 | European Pat. Off. . |
| 60-147823 | 3/1985 | Japan . |
| 60-55472 | 3/1985 | Japan . |
| 62-72059 | 4/1987 | Japan . |
| 62-73327 | 4/1987 | Japan . |

OTHER PUBLICATIONS

Borland Quattro User's Guide, 1987, pp. 18–20, 152.
Microsoft, Windows 3.0 User's Guide, 1990, pp.27–28.
IBM Technical Disclosure Bulletin; Menus Optimized for Performance and Ease of Use; vol. 25; No. 7A; Dec. 1982; pp. 3246–3248.

*Primary Examiner*—Anton W. Fetting
*Attorney, Agent, or Firm*—Staas & Halsey LLP

[57] ABSTRACT

The present invention is an apparatus in which selection from a graphic editing command menu is easy. An apparatus according to the present invention includes, a cursor moving unit for moving a cursor in accordance with an input operation, a graphic presence decision unit for deciding whether a graphic element is present at a moved cursor position, a command menu memory unit for storing a menu of graphic editing commands for each graphic element, a menu reading unit for reading a command menu which corresponds to a graphic element when it is decided that a graphic element is present, a command menu display unit for displaying a command menu which is read, a menu item selecting unit for selecting a menu item which is displayed at the moved cursor position in accordance with an input operation, and a command executing unit for executing a graphic editing command of the selected menu item.

18 Claims, 14 Drawing Sheets

Fig. 2A
PRIOR ART

| TOP MENU | |
|---|---|
| GRAPHIC DRAW | FILE |
| DIMENSION LINE | |
| CHARACTER | ANALYSIS CHANGEABLE |
| TOOL | |

| BASIC GRAPHIC DRAWING | |
|---|---|
| CREATE LINE | CREATE CIRCLE |
| OFFSET | FREE CURVED LINE |
| CHARACTER | HATCHING |
| OUTER SHAPE EDIT | PROJECTED LINE |
| DETAILED VIEW | ASSEMBLY AND DEVELOP |
| CUTTING | CUT AND PASTE |
| WINDOW-TO-WINDOW COPY | GRAPHIC EXPAND & COMPRESS |
| ROUNDING | BEVELLING |
| CHANGE LINE TYPE | MULTI-WINDOW |
| DELETE | MOVE |

31

546
596
572
622 — OUTER SHAPE LINE CREATE
262
740
220
622 — OUTER SHAPE LINE CREATE
58
434

144
812
476
694
32
376 — GRAPHIC OPERATION
408 — PARTIAL GRAPHIC EDIT
816
622 — OUTER SHAPE LINE CREATE
OVERLAPPED SCREEN — SEPARATE VOLUME SERVICE COMMAND
864

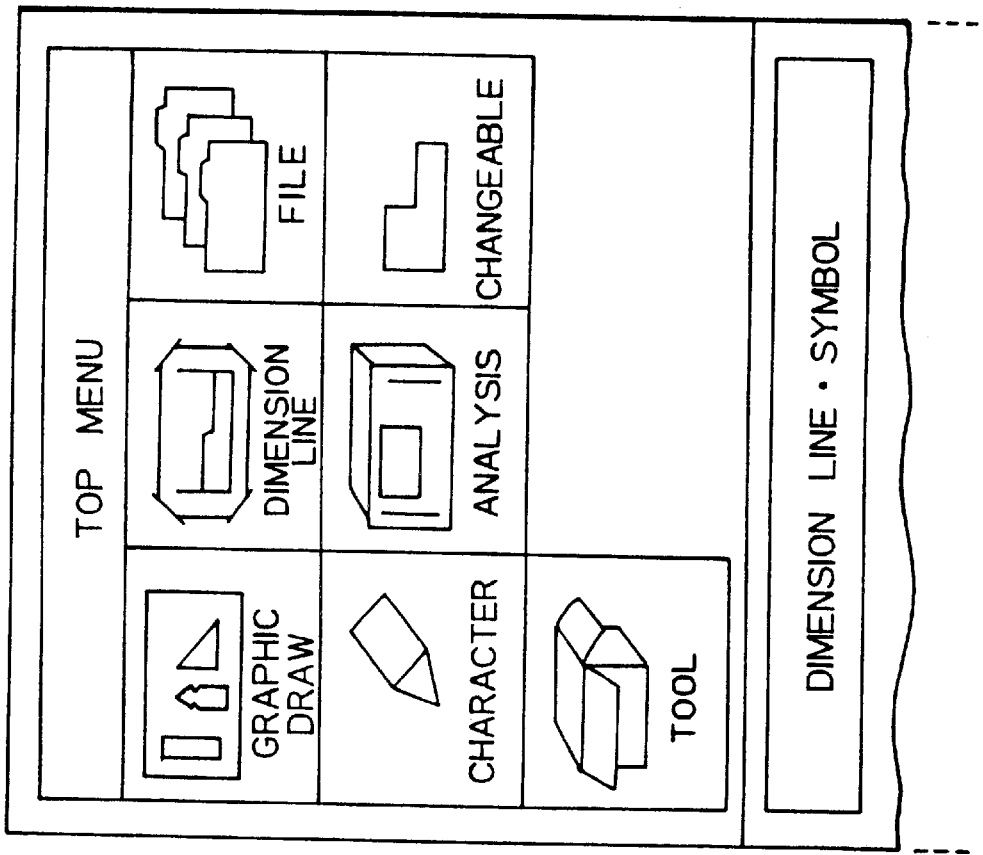

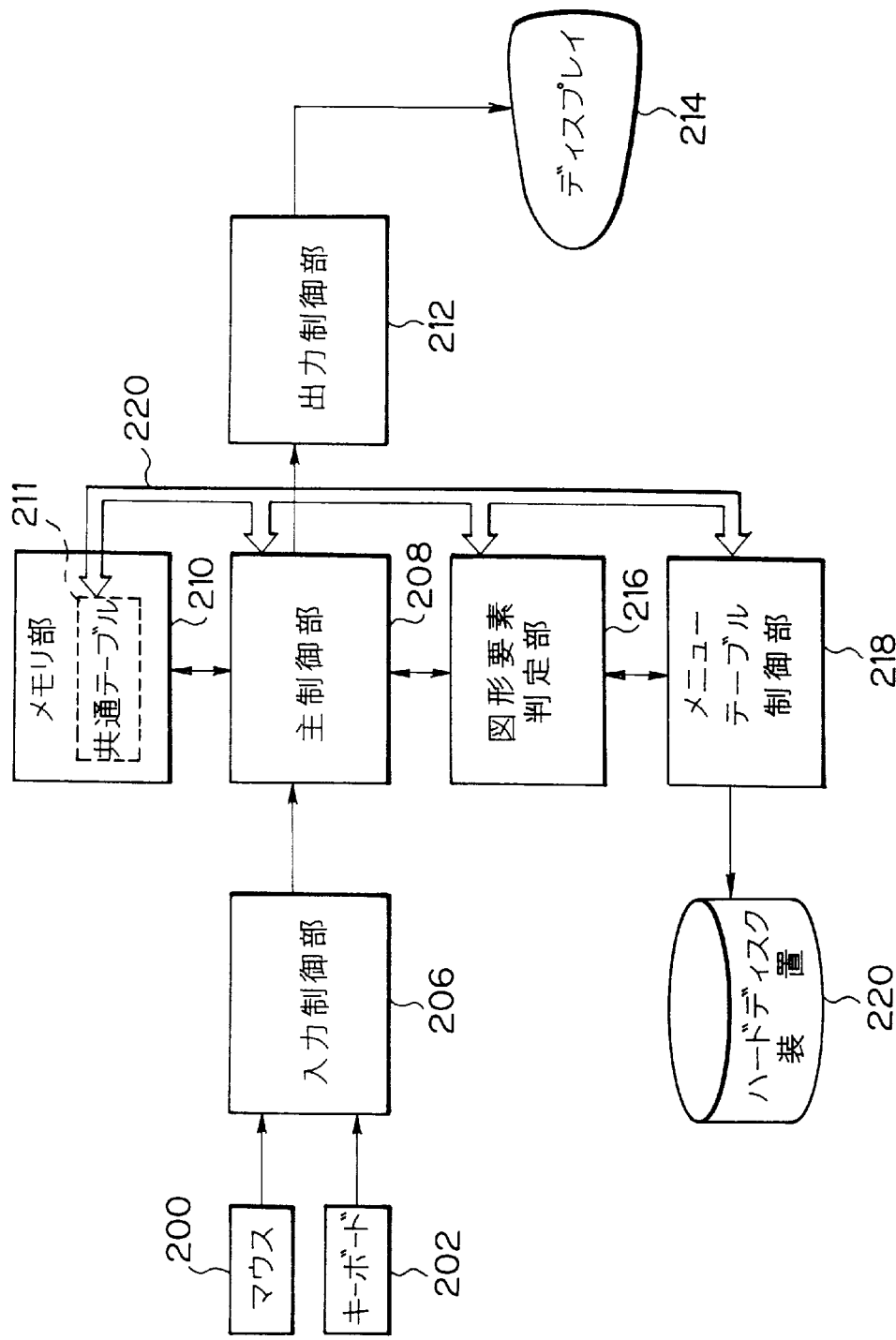

GRAPHICS EDITING DEVICE WHICH DISPLAYS ONLY CANDIDATE COMMANDS AT A POSITION ADJACENT TO A SELECTED GRAPHIC ELEMENT AND METHOD THEREFOR

This application is a continuation, of application Ser. No. 08/086,350, filed Jul. 6, 1993, now abandoned.

BACKGROUND OF THE INVENTION

1. Field of the Invention

The present invention relates to a graphic editing apparatus which displays a menu of graphic editing commands, and a method therefor. In a CAD system, a menu of graphic editing commands is displayed and a user chooses an item displayed in the menu so that an edit command of the selected item is carried out. Thus, it is possible to use a number of CAD system functions in an easy manner.

2. Description of the Prior Art

Since a conventional graphic editing apparatus is equipped with a number of edit commands and a display area on a screen for the commands is limited, the menus of these commands are organized in a hierarchical structure. A user moves a mouse cursor to a menu display area and selects one of the menu items with the mouse so that a desired command is selected. Having selected the desired command, the user specifies a target graphic element to be edited and calls for execution of the selected command on the edit target graphic element by using the mouse, whereby graphics editing such as move, rotate and deform is performed.

Since the hierarchical structure of the command menus becomes more complex and the number of the menu items increases as the functions of a CAD system are expanded, it is necessary to repeatedly confirm an item to be selected from a display menu, move the mouse cursor to the location of the item and select the item from the menu. Thus, selection from the menus is a burden on the user and causes deterioration of the operability of the system.

SUMMARY OF THE INVENTION

The present invention solves the above-mentioned problem. Therefore, it is an object of the present invention to offer a graphic editing apparatus in which selection of a graphic command from a menu is easy.

To achieve the above object, an apparatus according to the present invention has a structure as shown in FIG. 4. In FIG. 4, a graphic editing apparatus includes: cursor moving means for moving a cursor in accordance with an input operation; graphic presence decision means for deciding whether a graphic element is present at a moved cursor position; command menu memory means for storing a menu of graphic editing commands for each graphic element; menu reading means for reading a command menu which corresponds to a graphic element when it is decided that a graphic element is present; command menu display means for displaying a command menu which is read; menu item selecting means for selecting a menu item which is displayed at the moved cursor position in accordance with an input operation; and command executing means for executing a graphic editing command of the selected menu item.

Another graphic edit apparatus which achieves this object includes: cursor moving means for moving a cursor in accordance with an input operation; graphic presence decision means for deciding whether a graphic element is present at a moved cursor position; command menu memory means for storing a menu of graphic editing commands for each graphic element; menu reading means for reading a command menu which corresponds to a graphic element when it is decided that a graphic element is present; command menu display means for displaying a command menu which is read at the moved cursor position; menu item selecting means for selecting a menu item which is displayed at the moved cursor position in accordance with an input operation; and command executing means for executing a graphic editing command of the selected menu item.

According to the first apparatus, when a user moves the cursor, a command menu which corresponds to a graphic element which is located at the cursor position is displayed. The display menu items are prepared in advance. Hence, it is possible to limit the commands corresponding to these items to only those which are necessary in relation to the graphic element which is located at the cursor position.

According to the second apparatus, since the menu is displayed at the cursor position, the amount of cursor movement is held to a minimum.

BRIEF DESCRIPTION OF THE DRAWINGS

FIGS. 2(A) and 2(B) are views of examples 1 and 2 respectively in the conventional apparatus of FIG. 1, FIG. 2(A) showing an example of a Top Menu and a Basic Graphic Drawing and FIG. 2(B) schematically showing a Top Menu and a Dimension Line.Symbol as a symbol menu;

FIG. 9 is an explanatory diagram showing a structure according to a second embodiment of the present invention.

DESCRIPTION OF THE PREFERRED EMBODIMENTS

The present invention will be described in comparison to a conventional technique, with reference to the attached drawings.

Figure 1:
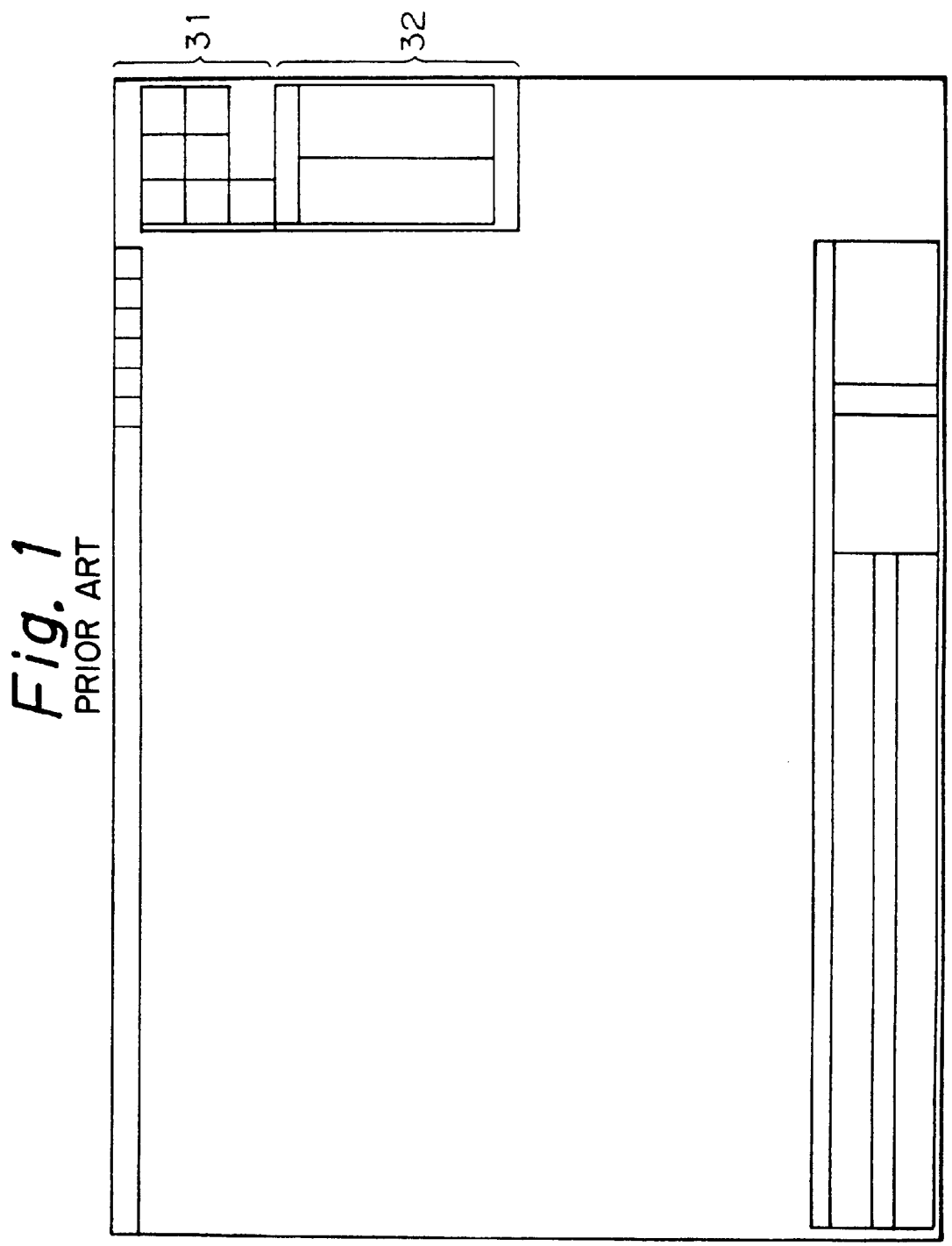
FIG. 1 is a schematic view showing an example of a menu in a conventional apparatus.

FIG. 1 is a view showing an example of a conventional menu. In FIG. 1, reference numeral 31 indicates a top menu and reference numeral 32 indicates a command menu. As shown in FIG. 2(A), for instance, the top menu is constructed as a symbol menu and includes symbols icons (1) Graphic Draw, (2) Dimension Line, (3) File, (4) Character, (5) Analysis, (6) Changeable and (7) Tool.

The command menu 32, for example, a Basic Graphic Drawing menu, includes the commands of Line Create (546), Offset (596), Character (572), Outer Shape Edit (622) . . . outer shape line create, Detailed View (262), Cutting (740), Window-to-Window Copy (220), Rounding (622) . . . outer shape line create, Line Type Change (58), Delete (434), Circle Create (144), Free Curved Line (812), Hatching (476), Projected Line (694), Assembly Develop (37) . . . graphic operation, Cut and Paste (408) . . . partial graphic edit, graphic magnify and reduce, Bevelling (622) . . . outer shape line create, multi-window (separate volume service command) . . . overlapped screen, and Move (864).

In the conventional technique, due to the number of editing commands and limited display area on the screen, the command menus tend to be organized in a hierarchical structure.

In a conventional graphic edit method, (1) to find a desired page from the command menus, one has to refer to a section in the user's manual called "How to use this manual", and (2) to find a desired page based on what one wants to do, one has to refer to an appendix "Appendix D Function index" of the manual.

Next, to find whether a command can be selected from the command menus, one has to refer to a reference "Commands classified by modules" of the manual and select the type of function one desires from a top menu. When a function is selected from the menu, a command menu which corresponds to the function is displayed. For each top menu, corresponding command menus are displayed.

Examples 1 and 2 of the menus are shown in FIGS. 2(A) and 2(B), respectively. In FIG. 2(A), following the top menu 31, the respective Basic Graphic Drawing items are displayed as the command menu 32. Index numbers are also displayed and explanations of some items are added. The multi-windows are overlapping screens on which separate volume service commands, which form an on-line optional manual (or handbook) regarding the service command which can be manipulated by means of a multi-window and form a separate volume type such as a magazine, are referred to. In FIG. 2(B), the top menu and the command menu Dimension Line.Symbol are shown (only the title is displayed).

Figure 3A:
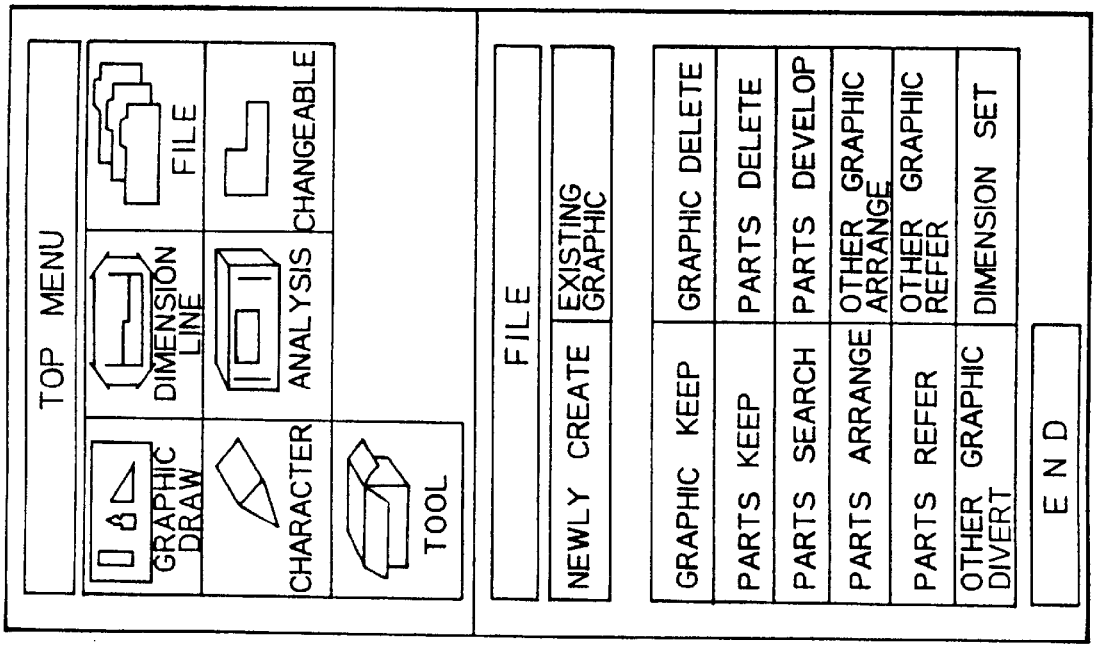
FIGS. 3(A) and 3(B) are views of examples 3 and 4, respectively in the conventional apparatus of FIG. 1, FIG. 3(A) showing the details of a Top Menu and a File and FIG. 3(B) schematically showing a Top Menu and a Document Processing.
Figure 3B:
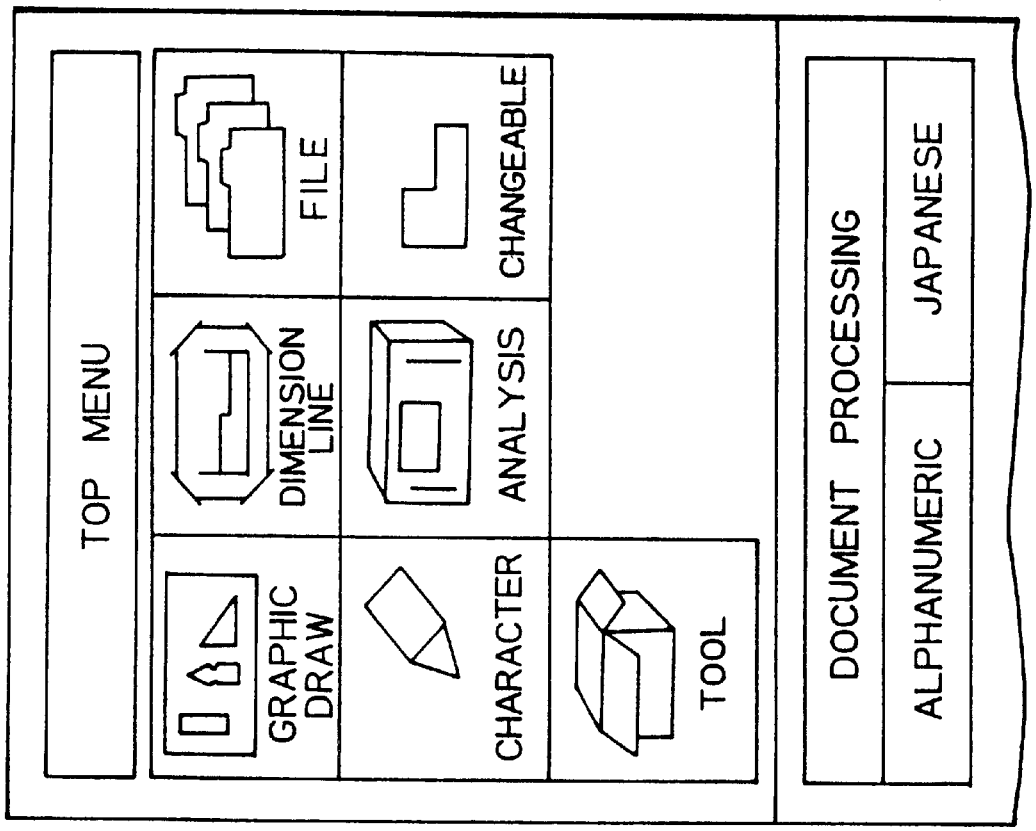

The details of the file command menu are shown in FIG. 3(A). The contents of the document processing command menu are shown in FIG. 3(B). That is, the file menu includes:

| | | |
|---|---|---|
| Newly Create | (re-setting process) | 734 |
| Existing Graphic | (re-setting process) | 734 |
| Graphic Save | (saving process) | 776 |
| Parts Save | (saving process) | 776 |
| Parts Search | (graphic operation) | 376 |
| Parts Arrange | (graphic operation) | 376 |
| Parts Reference | (graphic operation) | 376 |
| Other Graphic Diversion | (graphic operation) | 376 |
| Graphic Delete | | 710 |
| Parts Delete | (graphic operation) | 376 |
| Parts Develop | (graphic operation) | 376 |
| Other Graphic Arrange | | 642 |
| Other Graphic Reference | | 720 |
| Dimension Setting | | 402 |
| End | | 432 |

At the bottom of the document processing menu, document processing is divided into alphanumeric processing, Japanese processing and the like in FIG. 3(B).

On the screen display described above, a user moves the mouse cursor to a menu display area and clicks the mouse at one of the menu items and selects the menu items until a desired command is selected. Having selected the desired command, the user specifies an edit target graphic element to be edited and instructs execution of the selected command using the mouse, whereby graphics editing, such as move, rotate and deform, is performed.

However, since the hierarchical structure of the command menu becomes more complex and the number of the menu items increases as the functions of a CAD system are expanded, it is necessary to repeatedly confirm an item to be selected from the display menu, move the mouse cursor to the location of the item and select the item from the menu. Hence, repeated selection from the menu is a burden on the user which causes deterioration of the operability of the system.

The present invention solves such a problem of the conventional technique. An object of the present invention is therefore to offer a graphic edit apparatus in which selection of a graphic command from a menu is easy.

Figure 5:
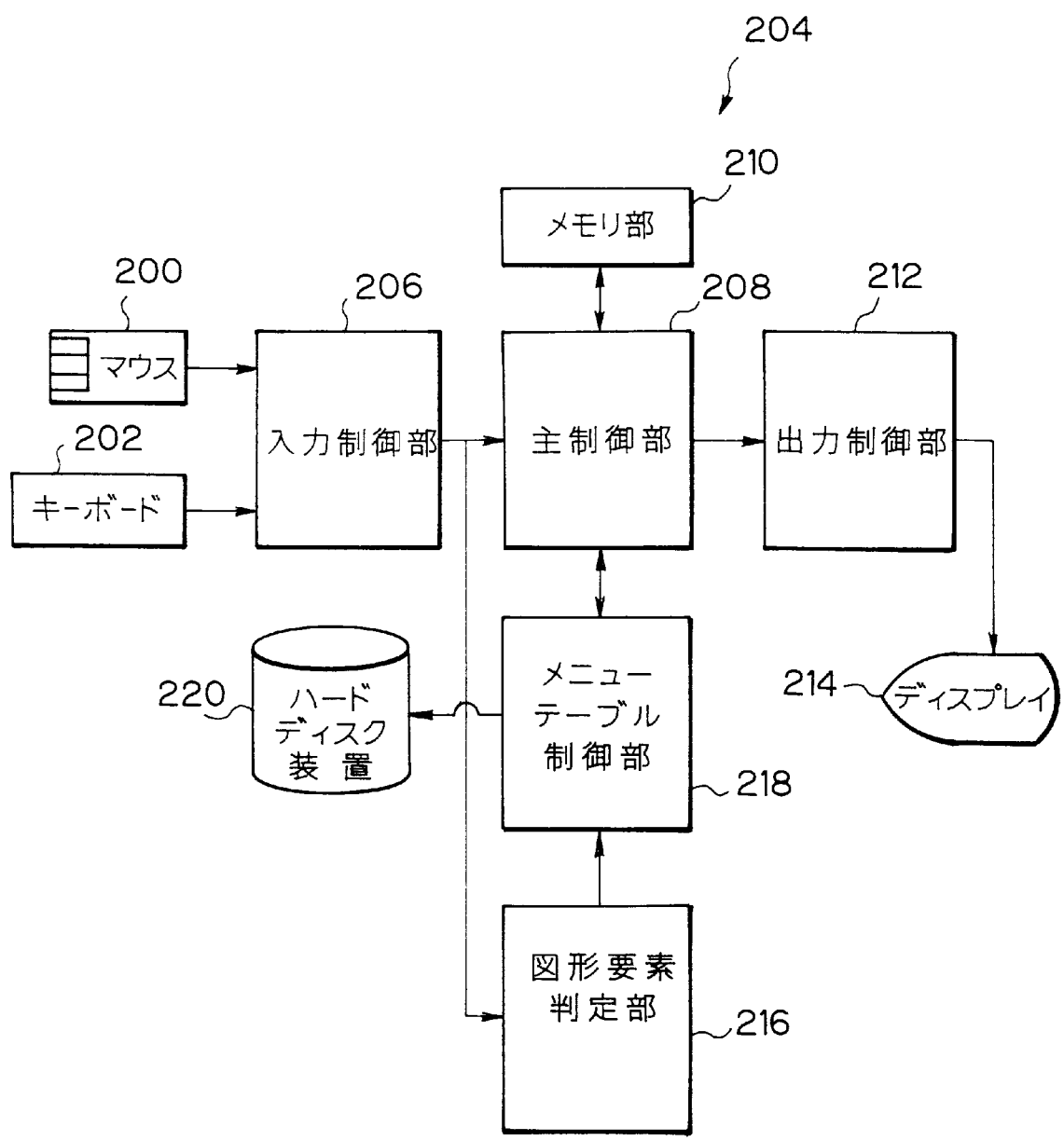
FIG. 5 is an explanatory diagram showing a structure according to a first embodiment of the present invention.

FIG. 5 is a view showing a structure according to the first embodiment of the present invention.

FIG. 5 explains the structure of the embodiment in which a mouse 200 and a keyboard 202 are operated by a user. Outputs of the mouse 200 and the keyboard 202 are given to an input control unit 206 of a processing device 204. The input control unit 206 transmits the outputs to a main control unit 208.

At the main control unit 208, various processes are performed using a memory unit 210. When calculation, in the main control unit 208, of the current position of the mouse cursor is performed based on the output of the input control unit 206, an output control unit 212 controls a display 214 and the mouse cursor displayed on the screen of the display 214 is moved in accordance with an operation of the mouse 200.

Meanwhile, a graphic element decision unit 216 decides whether a graphic element such as a straight line or a circular arc, is present in an area which is indicated by the current position of the mouse cursor. A menu table control unit 218 is informed of a processing result (decision result) which is yielded by the graphic element decision unit 216.

Figure 6:
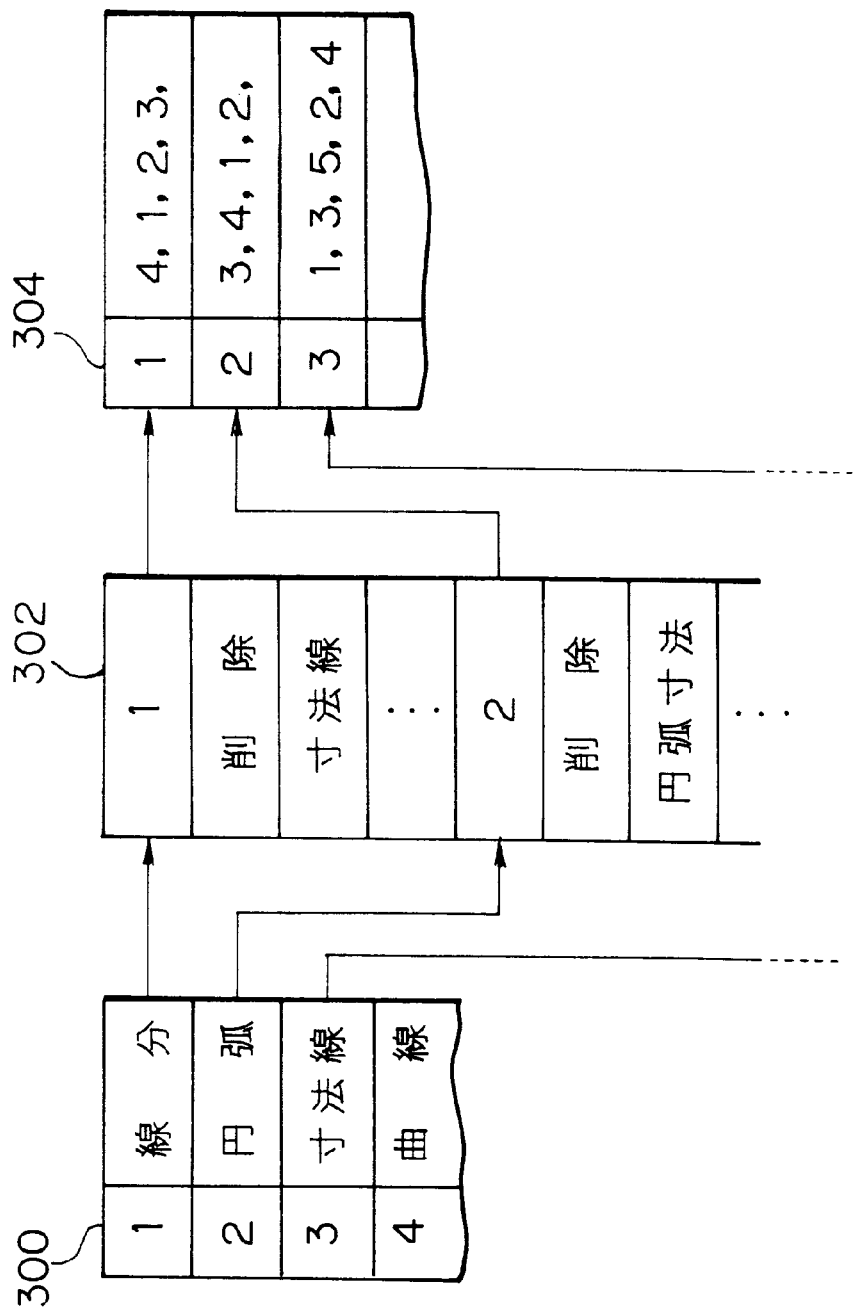
FIG. 6 is an explanatory diagram of tables each showing contents of a hard disk device of FIG. 5.

When informed of the existence of a graphic element from the graphic element decision unit 216, the menu table control unit 218 accesses a hard disk 220 and refers to a graphic element decision table 300, a menu control table 302 and a display order control table 304 of FIG. 6, in this order.

Of the tables, the graphic element decision table 300 of the hard disk 220 stores a list of basic graphic elements (i.e., line segments, circular arcs, dimension lines, curved lines, etc.). The number of a graphic element which is present in an area indicated by the current position of the mouse cursor is read.

The menu control table 302 stores a plurality of graphic editing commands in correspondence to the numbers of the respective graphic elements stored in the graphic element decision table 300 (stored therein are only candidate commands which will be executed following movement of the mouse cursor to a graphic element which corresponds to the number). All commands which correspond to graphic element numbers read in reference to the graphic element decision table 300 are read.

The display order control table 304 stores data regarding the order of display of the respective commands which correspond to the graphic element numbers. From the display order control table 304, control data are read which indicate a display order of the commands corresponding to the graphic element numbers found in reference to the graphic element decision table 300.

The menu table control unit 218 sorts the commands read from the menu control table 302 in accordance with the data read from the display order control table 304. The main control unit 208 is informed of the result of the processing.

The main control unit 208 sends a control instruction calling for the content received from the menu table control unit 218 to the output control unit 212. As a result, commands which correspond to a graphic element present in an area indicated by the current position of the mouse cursor are displayed as a menu on the display 214 in the order which is instructed by the display order control table 304 (FIG. 7).

At this stage, if a user operates the mouse and selects any menu item from the display menu, the corresponding content of the display order control table 304 are updated (the display order of the commands selected by the user is advanced) and the command of the selected item is carried out.

Figure 7:
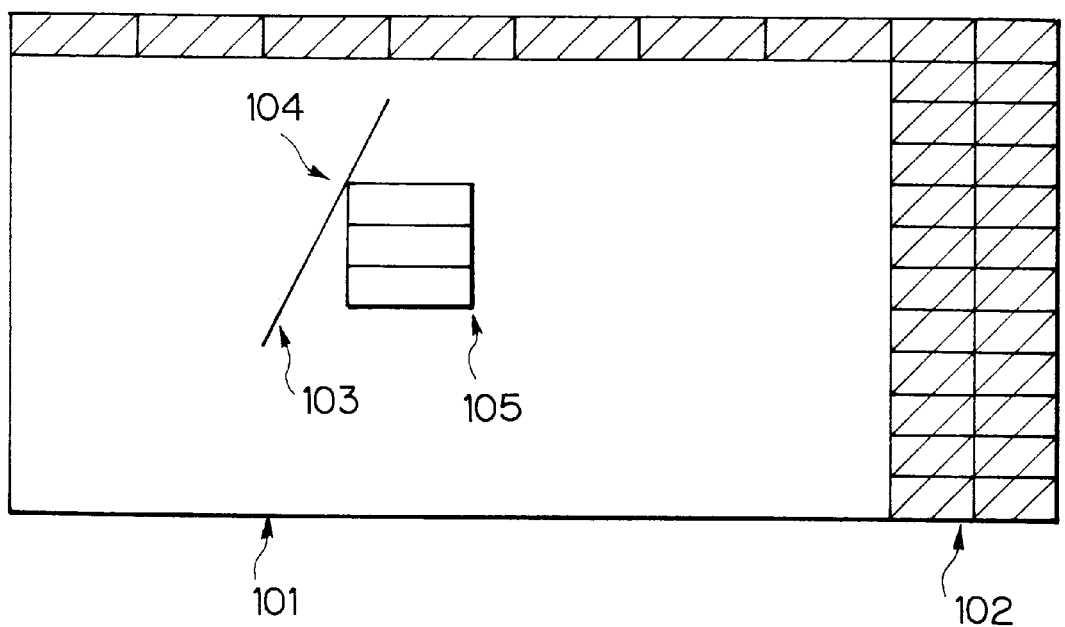
FIG. 7 is an explanatory diagram of a menu display screen.

FIG. 7 shows an editing work area 101, a menu area 102, a graphic element 103, a cursor 104 and a command menu 105 which is temporarily displayed as a pop up menu on the display screen in response to an instruction from an operator.

Figure 8:
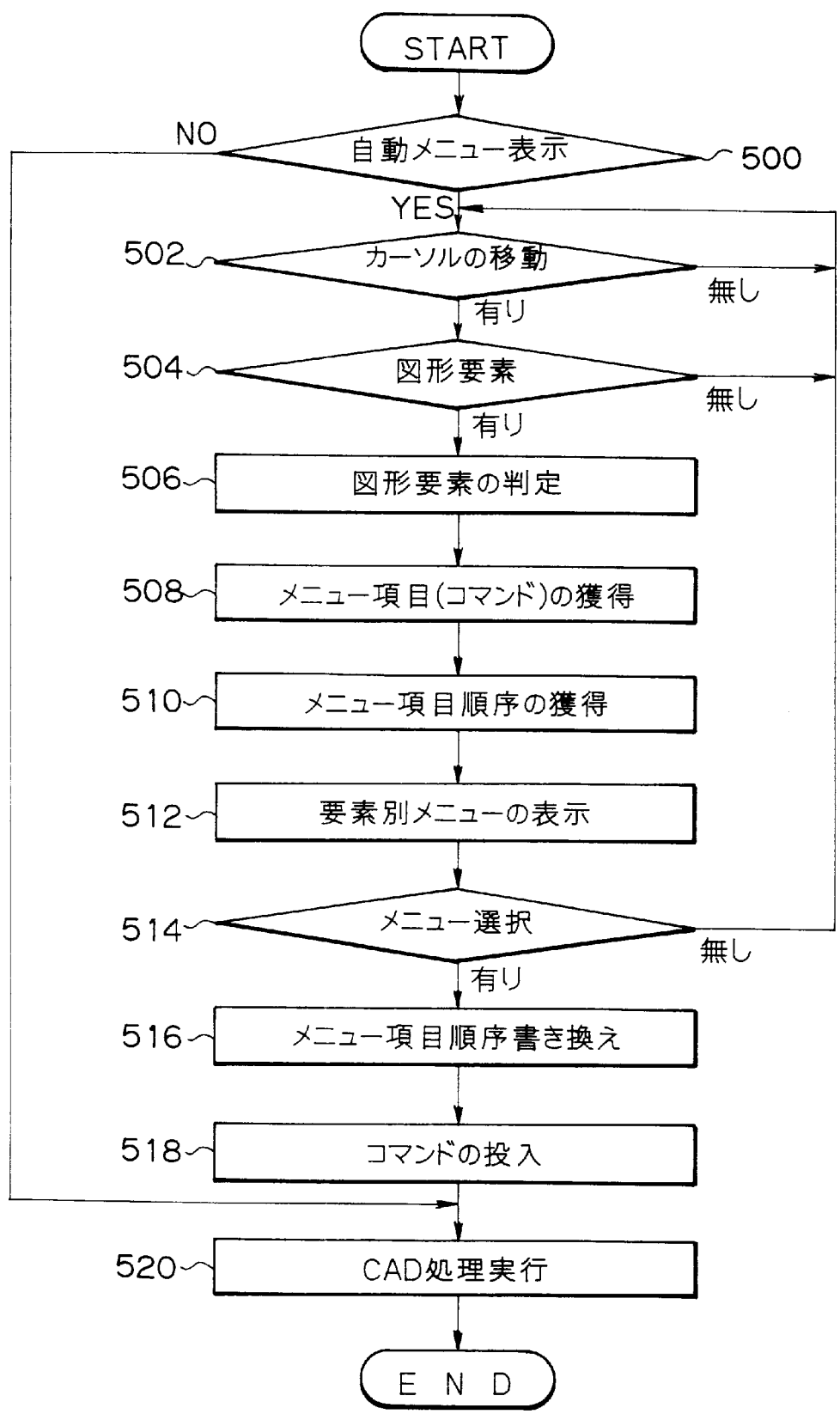
FIG. 8 is a flowchart for explaining the steps performed the first embodiment.

In FIG. 8, the flowchart explains the steps performed in this embodiment. First, a process is performed for checking whether a mode for automatically displaying a command menu at the position of the mouse cursor is set (Step 500).

If setting of the mode is confirmed (YES at Step 500), whether the mouse cursor has been moved is checked (Step 502). If movement of the mouse cursor is confirmed (MOVEMENT at Step 502), a decision is made whether a graphic element is present in an area indicated by the current position of the mouse cursor (Step 504).

If it is decided that a graphic element is present at this step (PRESENT at Step 504), the graphic element decision table 300 is referenced and the number which is assigned to the graphic element is read (Step 506).

Following this, the menu control table 302 is referenced and all the commands which correspond to the graphic element having the same number as was found in reference to the graphic element decision table 300, are read (Step 508).

Further, the display order control table 304 is referenced and corresponding data are read. Using the data thus read, the commands (which were read from the menu control table 302) are sorted (Step 510).

Next, these commands are displayed on the display 214 in the form of a menu in the sorted order at the current position of the mouse cursor (Step 512, FIG. 7) and operation of the menu selection is supervised (Step 514).

At this stage, if selection from the menu using the mouse is confirmed (YES at Step 514), the display order control table 304 is updated (i.e., the display order of the commands selected by the user is advanced) (Step 516), followed by the command of the selected item specified (Step 518) and the command is executed (Step 520).

As described above, if a user moves the mouse cursor onto any graphic element, only candidate commands which could be subsequently selected by the user to process the graphic element are automatically displayed in the form of a menu at the position of the mouse cursor.

Hence, according to the present invention, confirmation and selection of a command to be executed are easy and the amount of movement of the mouse cursor is held to a minimum necessary amount. This makes graphics editing efficient and greatly reduces the burden on a user.

FIG. 9 shows a second embodiment of the present invention. FIG. 9 is different from FIG. 5 in that a common table is provided in the memory unit 210, the graphic element decision unit 216 and the menu table control unit 218 are arranged in an opposite positional relationship and a control bus 220 is linked between a common table 211 of the memory unit 210, the main control unit 208, the graphic element decision unit 216 and the menu table control unit 218.

Figure 10A:
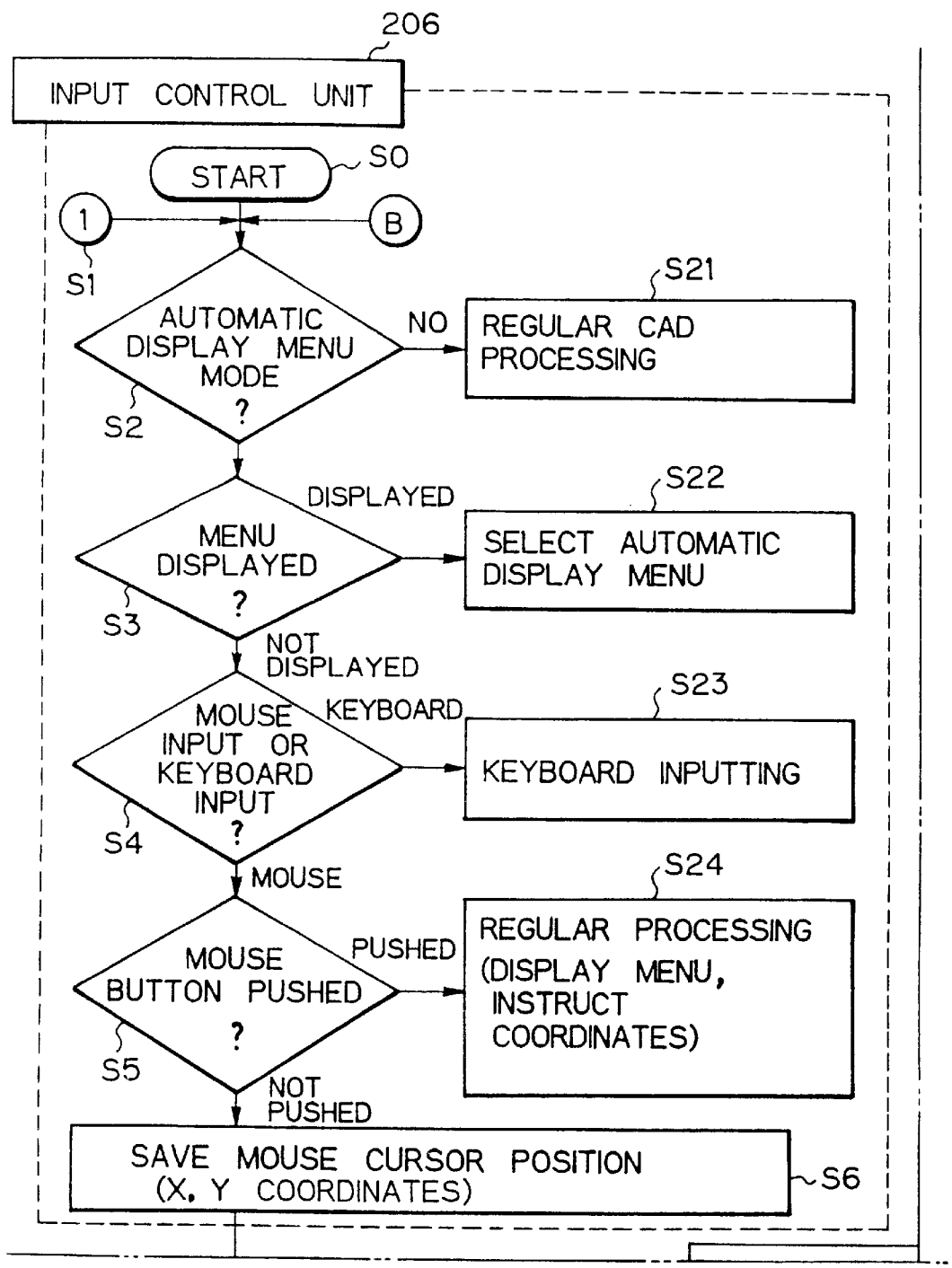
FIGS. 10(A), 10(B) and 10(C) are flowcharts for explaining the steps performed by principal parts of the second embodiment of FIG. 9.
Figure 10B:
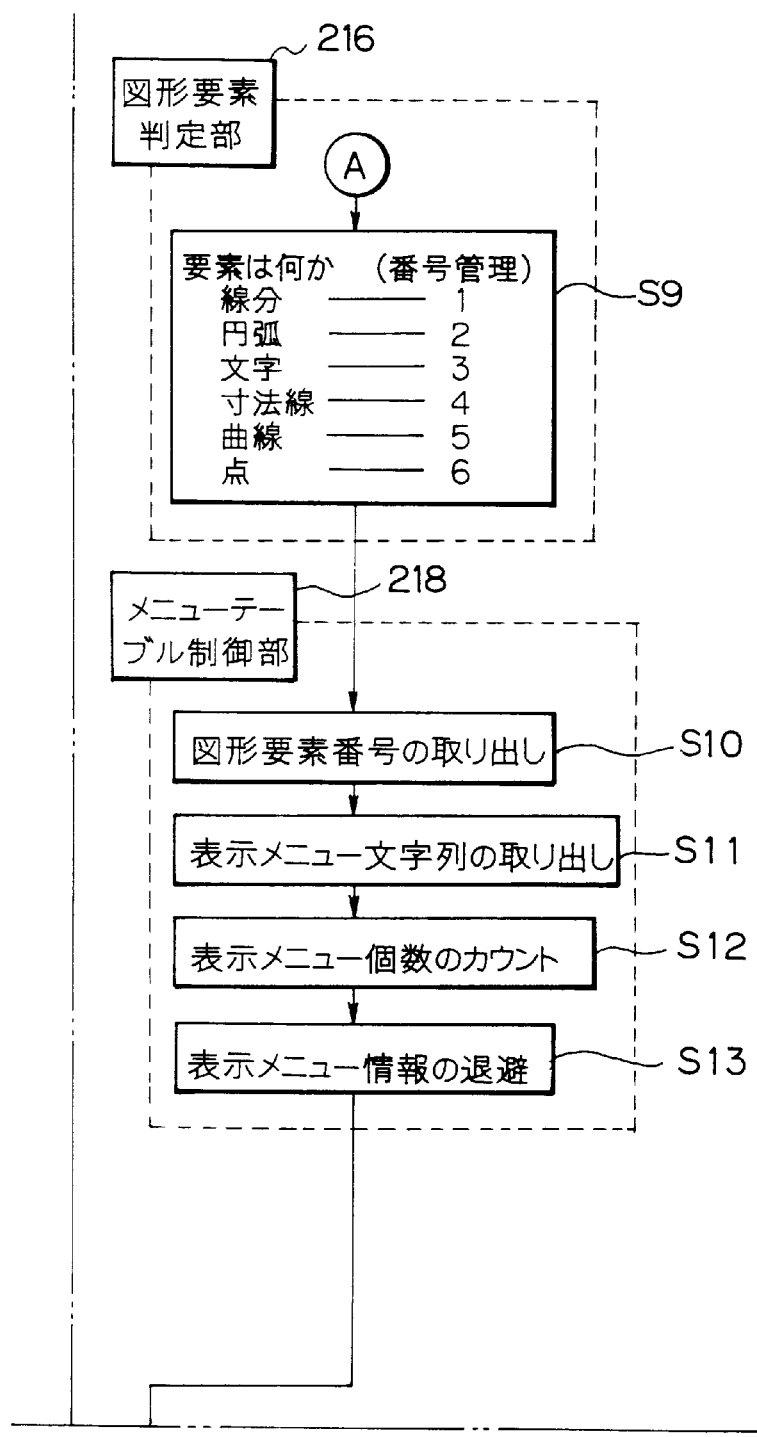
Figure 10C:
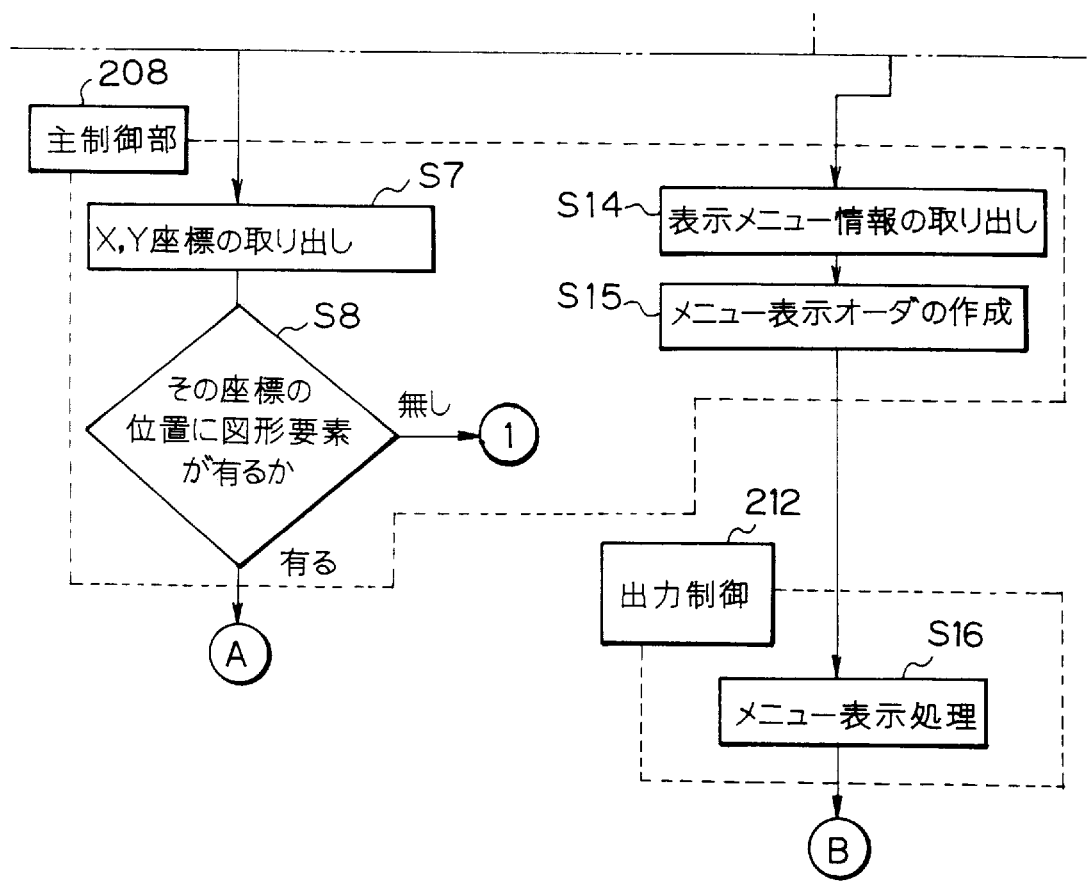

FIGS. 10(A), 10(B) and 10(C) are flowcharts showing the operations between the principal parts of FIG. 9.

Figure 4:
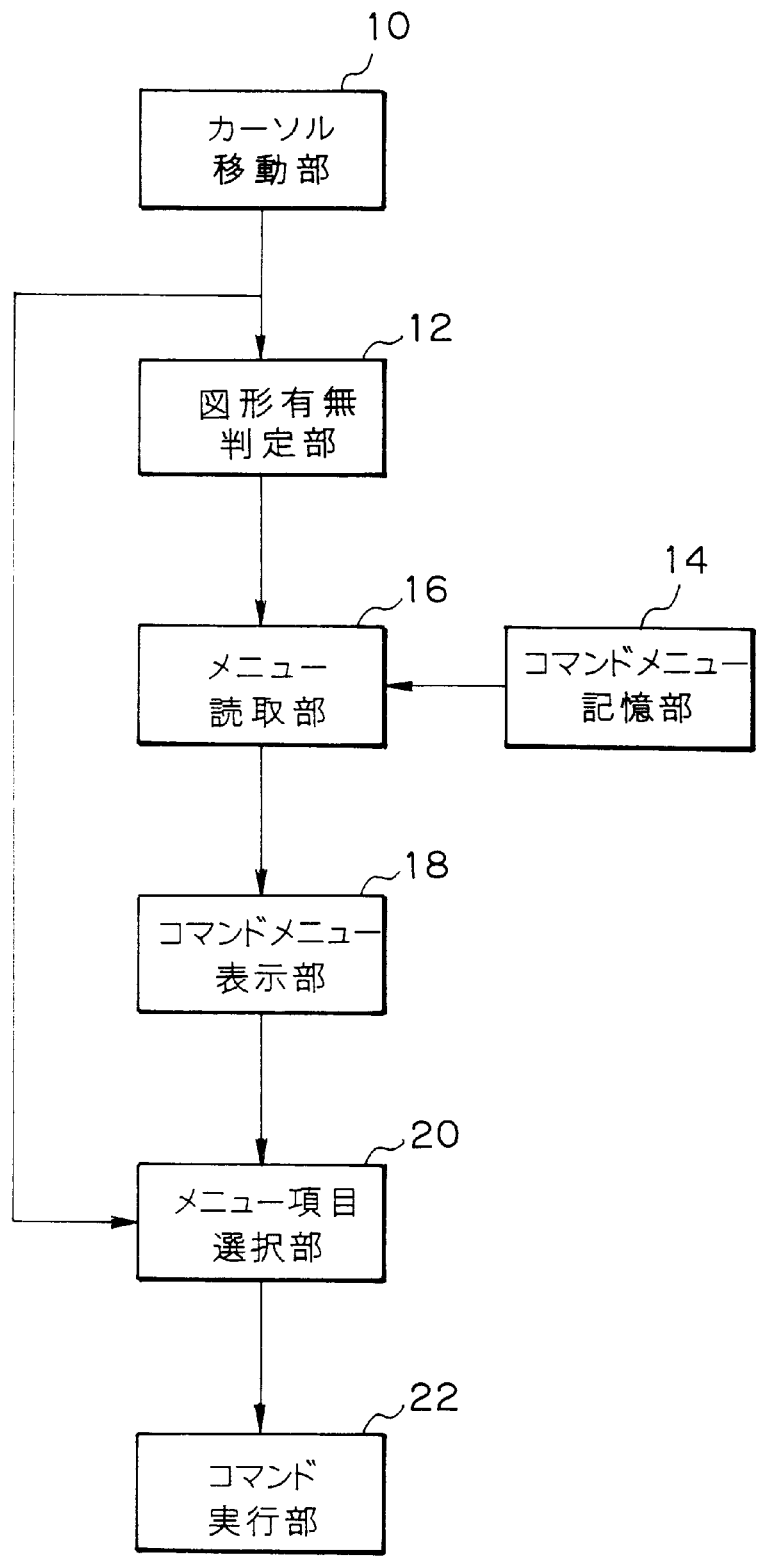
FIG. 4 is a view showing a basic structure of the present invention.

In FIGS. 10(A) and 10(B), when the input control unit 206 starts operating (S0), an output of the menu display process (S16) performed by the output control unit 212 or in the alternative, a NO output of the main control unit 208 to determine whether a graphic element is present at specific coordinates X, Y, (Step 8) is given to the input control unit 206 (Step 1). At Step 2, a decision is made whether the automatic display menu mode has been invoked or not. If NO at Step 2, regular CAD processing is carried out (Step 21) while if YES at Step 2, it is checked whether the menu is displayed or not. If the result of the decision is YES, selection from the automatic display menu is performed (Step 22). This corresponds to the steps which are performed by the parts 10 to 20 of FIG. 4. If the result of the decision is NO, indicating that the menu is not displayed, input by means of the mouse or the keyboard is selected (Step 4). Input using the keyboard is performed if keyboard input is selected (Step 23) while if the mouse input has been selected, a determination is made whether the mouse button is pushed (Step 5). If the mouse button has been pushed, regular mouse processing such as display of a menu and instruction of coordinates is performed (Step 24). If the mouse button has not been pushed, the mouse cursor position (X, Y coordinates) is withdrawn and temporarily stored (Step 6).

In the main control unit 208, shown in FIG. 10(C), the data withdrawn at Step 6 is addressed and the X, Y coordinates are retrieved (Step 7), followed by a decision whether a graphic element is present at the specific coordinates X, Y. If NO, the sequence returns to (Step 1) of the input control unit 206. If YES, the graphic element is given to the graphic element decision unit 216, as shown in FIG. 10(C), and management of the number of the graphic element is performed (Step 9). For such management, the numbers are preliminarily designated as a line segment (1), a circular arc (2), a character (3), a dimension line (4), a curved line (5) and a point (6), and used in the menu control table and the display order control table in a manner as shown in FIG. 6.

The number management data used at Step 9 are addressed and sent to the menu table control unit 218 so that the graphic element number is retrieved first (Step 10) and a display menu character stream is retrieved next (Step 11). Following this, display menus are counted (Step 12) and the display menu information is withdrawn to the main control unit 208 once it is saved (Step 13). The main control unit 208 retrieves the display menu information in accordance with an address (Step 14), and the menu display order is created (Step 15). The created data are then sent to the output control unit 212 so that the menu is formally displayed (Step 16). The output of this menu display processing returns to Step 1 of the input control unit 206 again and the subsequent steps are again repeated.

As heretofore described, according to the present invention, selection of a command is performed in an easy manner due to automatic display of a command menu which corresponds to a graphic element which is displayed at the current cursor position, and the current menu is displayed at the cursor position so that the cursor needs be moved by a minimum necessary amount to perform selection from the menu. Hence, a burden on a user is largely reduced and the drawing efficiency is dramatically enhanced.

What is claimed is:

1. A graphic editing apparatus for editing graphic elements presented on a display, the graphic elements comprising a predetermined number of distinct element types, said graphic editing apparatus comprising:

cursor moving means for moving a cursor to a moved cursor position on the display in accordance with a first input operation by a user;

graphic presence decision means for deciding whether one of the graphic elements is present at said moved cursor position;

command menu memory means for storing command menus of graphic editing commands for respective distinct element types;

menu reading means for reading from said command menu memory means one of said command menus corresponding to a distinct element type of said one graphic element determined to be present at said moved cursor position by said graphic presence decision means;

command menu display means for displaying the one of said command menus of corresponding graphic editing commands, read by said menu reading means, on the display;

menu item selecting means for selecting one of said graphic editing commands displayed on the display, on a spot thereof, in accordance with a second input operation by the user;

display order means for storing orders of display of the graphic editing commands for each command menu and modifying the order of graphic editing commands of the one of said command menus on the display based upon the selection of the one of said graphic editing commands selected on the spot by said menu item selecting means; and command executing means for executing the one of said graphic editing commands selected on the spot by said menu item selecting means, thereby minimizing an amount of movement by the mouse.

2. A graphic editing apparatus for editing graphic elements presented on a display, the graphic elements comprising a predetermined number of distinct element types, said graphic editing apparatus comprising:

cursor moving means for moving a cursor to a moved cursor position on the display in accordance with a first input operation by a user;

graphic presence decision means for deciding whether one of said graphic elements is present at said moved cursor position;

command menu memory means for storing command menus of graphic editing commands for respective distinct element types;

menu reading means for reading from said command menu memory means one of said command menus corresponding to a distinct element type of the one of said graphic elements determined to be present at said moved cursor position by said graphic presence decision means;

command menu display means for displaying the one of said command menus of corresponding graphic editing commands, read by said menu reading means, at said moved cursor position on the display;

menu item selecting means for selecting one of said graphic editing commands displayed at said moved cursor position on the display, on a spot thereof, in accordance with a second input operation by the user;

display order means for storing orders of display of the graphic editing commands for each command menu and modifying the order of graphic editing commands of the one of said command menus on the display based upon the selection of the one of said graphic editing commands selected by said menu item selecting means; and command executing means for executing the one of said graphic editing commands selected on the spot by said menu item selecting means, thereby minimizing an amount of movement by the mouse.

3. A method of editing graphics, comprising the steps of:

checking whether a mode for automatically displaying a command menu at a current position of a mouse cursor has been invoked;

checking whether the mouse cursor has been moved if said mode for automatically displaying a command menu has been invoked;

determining whether a graphic element is present in an area indicated by the current position of the mouse cursor after confirming movement of the mouse cursor;

referring to a graphic element decision table and reading a number assigned to an element type of the graphic element in response to said determination that a graphic element is present in said area;

referring to a menu control table and reading all commands which correspond to the graphic element number read from the graphic element decision table;

referring to a display order table and reading display order data indicating an order of said commands read from the menu control table and sorting the commands read from the menu control table based on the order data;

displaying the sorted commands in a form of a menu at the current position of the mouse cursor on a display and receiving an input from a user selecting one of said displayed sorted commands of said menu, on a spot thereof; and updating the display order control table by rearranging the order data to reorder the displayed sorted commands in the menu on the display when the selection by the user is determined and carrying out the one of said displayed sorted commands selected on the snot by the user, thereby minimizing an amount of movement by the mouse.

4. A graphic editing apparatus for editing graphic elements on a display by using a mouse cursor, the graphic elements comprising a predetermined number of distinct element types, said graphic editing apparatus comprising:

a mouse detecting a direction and an amount of movement along a given plane upon movement of said mouse by a user;

a keyboard transmitting information received from the user;

an input control unit receiving outputs of said mouse and said keyboard and, in response, generating a mouse input signal and a keyboard input signal, respectively;

a memory unit;

a main control unit receiving said mouse input signal and said keyboard signal and determining a current position of the mouse cursor on the display using said memory unit based upon said mouse input signal received from said input control unit and, in response thereto, generating output signals;

an output control unit controlling the display in response to said output signals of said main control unit and moving the mouse cursor on the display in accordance with movement of said mouse;

a graphic element decision unit determining whether one of said plurality of graphic elements is present in an area indicated by the current position of the mouse cursor;

a hard disk including a graphic element decision table storing a list of the predetermined number of distinct element types, a menu control table storing command menus of graphic editing commands for respective ones of the distinct element types and a display order control table storing order data indicating display orders of the graphic editing commands for respective ones of said command menus; and a menu table control unit receiving the determination of said graphic element decision unit, accessing said hard disk when one of the graphic elements is present in said area, reading the graphic element decisions table, the menu control table and the display order control table in order, sorting a plurality of the graphic editing commands corresponding to a distinct element type of the graphic element present in the area based upon the order data and sending the sorted graphic editing commands to said main control unit; and said main control unit sending said sorted plurality of graphic editing commands to said output control unit;

said output control unit displaying said sorted plurality of graphic editing commands in a display menu on the display; and when one of said sorted plurality of graphic editing commands is selected, on a spot thereof, by the user, said display order control table updates the order data by rearranging the order data to reorder said plurality of graphic editing commands to be displayed and said main control unit carries out said one graphic editing command selected on the spot by the user, thereby minimizing an amount of movement by the mouse.

5. The graphic editing apparatus as claimed in claim 4, wherein:

said graphic element decision unit assigns a graphic element number for each distinct element type stored therein;

said menu control table stores the graphic editing commands for respective graphic element numbers assigned in said graphic element decision unit; and said menu table control unit reads the graphic editing commands corresponding to the graphic element number of the distinct element type of the one of the graphic elements present in said area.

6. The graphic editing apparatus as claimed in claim 4, wherein:

said graphic element decision unit assigns a graphic element number for each distinct element type stored therein;

said menu control table stores the graphic editing commands for respective graphic element numbers assigned in said graphic element decision unit;

said display order control table stores in numerical order of the graphic element numbers, the order data indicating an order of display of said graphic editing commands for each distinct element type; and said menu control table control unit reading the order data and graphic editing commands corresponding to the graphic element number of the distinct element type of the one of the graphic elements present in said area.

7. The graphic editing apparatus as claimed in claim 4, wherein the distinct element types comprise:

a line segment;

a circular arc;

a dimension line; and a curved line.

8. A graphic editing apparatus for editing graphic elements, said graphic editing apparatus comprising:

a display for displaying the graphic elements; and a graphic display control unit determining which one of the graphic elements exists at a position of a cursor on said display, displaying a menu of commands based upon the one of the graphic elements at the position, the menu including commands executable with respect to the one of the graphic elements; and a display order unit modifying an order of display of the commands based upon a selection of one of the commands, on a spot thereof, by a user, thereby minimizing an amount of movement by the mouse based on a highest frequency of use of the commands.

9. The graphic editing apparatus as claimed in claim 8, wherein the menu is displayed on said display adjacent to the cursor.

10. A method of editing graphics, comprising the steps of:

determining a graphic element at a position of a cursor;

displaying a menu of commands responsive to the determination, the menu including commands executable with respect to the graphic element; and modifying an order of display of the commands based upon a selection of one of the commands, on a spot thereof, by a user, thereby minimizing an amount of movement by the mouse based on a highest frequency of use of the commands.

11. The method as claimed in claim 10, wherein said step of displaying a menu of commands further comprises displaying the menu adjacent to the cursor.

12. A graphic editing apparatus for editing graphic elements presented on a display, the graphic elements comprising a predetermined number of distinct element types, said graphic editing apparatus comprising:

cursor moving means for moving a cursor to a moved cursor position on the display in accordance with a first input operation by a user;

graphic presence decision means for deciding whether one of said graphic elements is present at said moved cursor position;

command menu memory means for storing command menus of graphic editing commands for respective distinct element types;

menu reading means for reading from said command menu memory means one of said command menus corresponding to a distinct element type of the one of said graphic elements determined to be present at said moved cursor position by said graphic presence decision means;

command menu display means for displaying the one of said command menus of corresponding graphic editing commands, read by said menu reading means, at said moved cursor position on the display;

menu item selecting means for selecting one of said graphic editing commands displayed at said moved cursor position on the display, on a spot thereof, in accordance with a second input operation by the user;

display order means for storing orders of display of the graphic editing commands for each command menu and modifying the order of graphic editing commands of the one of said command menus based upon a selection of one of the commands, on a spot thereof, by the user so that the one of said graphic editing commands selected on the spot by said menu item selecting means is the closest of said graphic editing commands to said moved cursor position, thereby minimizing an amount of cursor movement; and command executing means for executing the one of said graphic editing commands selected on the spot by said menu item selecting means, thereby minimizing an amount of movement by the mouse.

13. A graphic editing apparatus for editing graphic elements presented on a display, the graphic elements comprising a predetermined number of distinct element types, said graphic editing apparatus comprising:

cursor moving means for moving a cursor to a moved cursor position on the display in accordance with a first input operation by a user;

graphic presence decision means for deciding whether one of the graphic elements is present at said moved cursor position;

command menu memory means for storing command menus of graphic editing commands for respective distinct element types;

menu reading means for reading from said command menu memory means one of said command menus corresponding to a distinct element type of said one graphic element determined to be present at said moved cursor position by said graphic presence decision means;

command menu display means for displaying the one of said command menus of corresponding graphic editing commands, read by said menu reading means, on the display;

menu item selecting means for selecting one of said graphic editing commands displayed on the display, in accordance with a second input operation by the user;

display order means for storing orders of display of the graphic editing commands for each command menu and modifying the order of graphic editing commands of the one of said command menus based upon a selection of one of the commands, on a spot thereof, by a user, thereby minimizing an amount of cursor movement based on a highest frequency of use of said graphic editing commands selected by said menu item selecting means; and command executing means for executing the one of said graphic editing commands selected by said menu item selecting means.

14. A graphic editing apparatus for editing graphic elements presented on a display, the graphic elements comprising a predetermined number of distinct element types, said graphic editing apparatus comprising:

cursor moving means for moving a cursor to a moved cursor position on the display in accordance with a first input operation by a user;

graphic presence decision means for deciding whether one of said graphic elements is present at said moved cursor position;

command menu memory means for storing command menus of graphic editing commands for respective distinct element types;

menu reading means for reading from said command menu memory means one of said command menus corresponding to a distinct element type of the one of said graphic elements determined to be present at said moved cursor position by said graphic presence decision means;

command menu display means for displaying the one of said command menus of corresponding graphic editing commands, read by said menu reading means, at said moved cursor position on the display;

menu item selecting means for selecting one of said graphic editing commands displayed at said moved cursor position on the display, in accordance with a second input operation by the user;

display order means for storing orders of display of the graphic editing commands for each command menu and modifying the order of graphic editing commands of the one of said command menus based upon a selection of one of the commands, on a spot thereof, by the user, thereby minimizing an amount of cursor movement based on a highest frequency of use of said graphic editing commands selected by said menu item selecting means; and command executing means for executing the one of said graphic editing commands selected by said menu item selecting means.

15. A method of editing graphics, comprising the steps of:

checking whether a mode for automatically displaying a command menu at a current position of a mouse cursor has been invoked;

checking whether the mouse cursor has been moved if said mode for automatically displaying a command menu has been invoked;

determining whether a graphic element is present in an area indicated by the current position of the mouse cursor after confirming movement of the mouse cursor;

referring to a graphic element decision table and reading a number assigned to an element type of the graphic element in response to said determination that a graphic element is present in said area;

referring to a menu control table and reading all commands which correspond to the graphic element number read from the graphic element decision table;

referring to a display order table and reading display order data indicating an order of said commands read from the menu control table and sorting the commands read from the menu control table based on the order data;

displaying the sorted commands in a form of a menu at the current position of the mouse cursor on a display and receiving an input from a user selecting one of said displayed sorted commands of said menu; and updating the display order control table by rearranging the order data to reorder the displayed sorted commands in the menu based upon a selection of one of the commands, on a spot thereof, by the user, thereby minimizing an amount of movement by the mouse cursor bases on a highest frequency of use of selections of a plurality of said displayed sorted commands by the user and carrying out the one of said displayed sorted commands selected by the user.

16. A graphic editing apparatus for editing graphic elements on a display by using a mouse cursor, the graphic elements comprising a predetermined number of distinct element types, said graphic editing apparatus comprising:

a mouse detecting a direction and an amount of movement along a given plane upon movement of said mouse by a user;

a keyboard transmitting information received from the user;

an input control unit receiving outputs of said mouse and said keyboard and, in response, generating a mouse input signal and a keyboard input signal, respectively;

a memory unit;

a main control unit receiving said mouse input signal and said keyboard signal and determining a current position of the mouse cursor on the display using said memory unit based upon said mouse input signal received from said input control unit and, in response thereto, generating output signals;

an output control unit controlling the display in response to said output signals of said main control unit and moving the mouse cursor on the display in accordance with movement of said mouse;

a graphic element decision unit determining whether one of said plurality of graphic elements is present in an area indicated by the current position of the mouse cursor;

a hard disk including a graphic element decision table storing a list of the predetermined number of distinct element types, a menu control table storing command menus of graphic editing commands for respective ones of the distinct element types and a display order control table storing order data indicating display orders of the graphic editing commands for respective ones of said command menus; and a menu table control unit receiving the determination of said graphic element decision unit, accessing said hard disk when one of the graphic elements is present in said area, reading the graphic element decisions table, the menu control table and the display order control table in order, sorting a plurality of the graphic editing commands corresponding to a distinct element type of the graphic element present in the area based upon the order data and sending the sorted graphic editing commands to said main control unit; and said main control unit sending said sorted plurality of graphic editing commands to said output control unit;

said output control unit displaying said sorted plurality of graphic editing commands in a display menu on the display; and when one of said sorted plurality of graphic editing commands is selected by the user, said display order control table updates the order data by rearranging the order data to reorder said plurality of graphic editing commands to be displayed based upon a highest frequency of use of said plurality of graphic editing commands selected by the user and said main control unit carries out said one graphic editing command selected by the user.

17. A graphic editing apparatus for editing graphic elements, said graphic editing apparatus comprising:

a display displaying the graphic elements; and a graphic display control unit determining which one of the graphic elements exists at a position of a cursor on said display, displaying a menu of commands based upon the one of the graphic elements at the position, the menu including commands executable with respect to the one of the graphic elements; and a display order unit modifying an order of display of the commands based upon a selection of one of the commands, on a spot thereof, by a user, thereby minimizing an amount of cursor movement based on a highest frequency of use of selections of the commands by a user.

18. A method of editing graphics, comprising the steps of:

determining a graphic element at a position of a cursor;

displaying a menu of commands responsive to the determination, the menu including commands executable with respect to the graphic element; and modifying an order of display of the commands based upon a selection of one of the commands, on a spot thereof, by a user, thereby minimizing an amount of cursor movement based on a highest frequency of use of selections of the commands by a user.

* * * * *

UNITED STATES PATENT AND TRADEMARK OFFICE
CERTIFICATE OF CORRECTION

PATENT NO.    : 6,049,335
DATED         : April 11, 2000
INVENTOR(S)   : Masahiro IIDA It is certified that error appears in the above-identified patent and that said Letters Patent is hereby corrected as shown below:

Column 8,
Line 51, change "snot" to --spot--.

Signed and Sealed this

Third Day of July, 2001

Attest:

NICHOLAS P. GODICI
Attesting Officer    Acting Director of the United States Patent and Trademark Office